Oct. 23, 1923.
W. G. HOUSKEEPER
VACUUM PUMP
Filed June 20, 1921
1,471,662
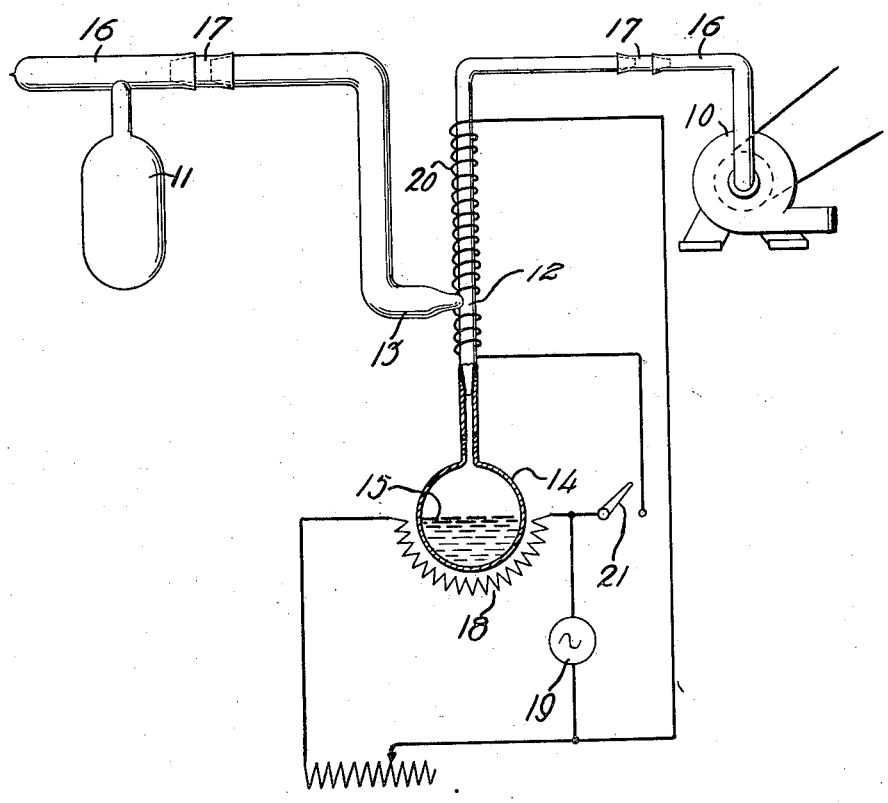
Inventor:
William G Houskeeper:
by W E Beatty Atty.

Patented Oct. 23, 1923.

1,471,662

UNITED STATES PATENT OFFICE.

WILLIAM G. HOUSKEEPER, OF NEW YORK, N. Y., ASSIGNOR TO WESTERN ELECTRIC COMPANY, INCORPORATED, OF NEW YORK, N. Y., A CORPORATION OF NEW YORK.

VACUUM PUMP.

Application filed June 20, 1921. Serial No. 478,975.

*To all whom it may concern:*

Be it known that I, WILLIAM G. HOUSKEEPER, a citizen of the United States, residing at New York, in the county of New York, State of New York, have invented certain new and useful Improvements in Vacuum Pumps, of which the following is a full, clear, concise, and exact description.

This invention relates to vacuum pumps of the entraining or aspirator type and to methods of operating the same.

This application is a continuation in part of my copending application Serial No. 406,923, filed August 30, 1920.

In the production of the high vacua employed in vacuum tubes of the pure electron discharge type, it has heretofore been customary to connect a tube to be evacuated to a low vacuum pump, for example, a mechanical pump capable of pumping out to a pressure of $10^{-3}$ mm. of mercury or thereabouts and to produce a high vacuum by the use of an aspirator, employing mercury vapor, connected between the low vacuum or roughing pump and the tube being exhausted. An example of apparatus of this kind is disclosed in the application of O. E. Buckley, Serial No. 96,265, filed May 8, 1916. Since mercury at room temperatures has a vapor pressure in excess of the pressure desired in vacuum tubes, it has been necessary to provide a trap cooled by liquid air to prevent mercury vapor from diffusing back into the tube being exhausted. This is a disadvantage on account of the expense of, and difficulty in handling liquid air.

It is an object of this invention to provide an auxiliary pump of the aspirator type employing a pumping medium of such a character that the need of a liquid air trap is avoided.

It is a further object of the invention to provide a means and method for utilizing a limited amount of pumping medium in a continuous operation.

As a pumping medium in a pump embodying my invention there may be used substances such as lead, tin, bismuth, cadmium, zinc and the like which have at room temperatures vapor pressures less than a pressure of $10^{-6}$ mm. of mercury, the usual pressure within a vacuum tube of the pure electron discharge type, and which at higher temperatures have a vapor pressure in excess of $10^{-3}$ mm. of mercury, the pressure ordinarily obtainable with the usual roughing pumps. Of these substances, lead, tin and bismuth have at their melting temperatures vapor pressures less than $10^{-6}$ mm. of mercury, which fact renders them particularly useful as pumping media, since they may be heated in their molten condition to a sufficiently high temperature to cause the emanation of a vapor stream, usable to entrain gas from the vessel to be exhausted, which may be condensed into a liquid state and caused to flow back to the source at a temperature for which the vapor pressure of the metal is below the desired pressure in the vessel to be exhausted. Zinc and cadmium will sublimate or vaporize at a temperature below their melting temperature under the vacua which is produced by a roughing pump and have at a temperature slightly below their melting points a vapor pressure in excess of that produced by the roughing pump. A vapor stream may, therefore, be produced from said substances without melting them, and utilized as a pumping medium and then condensed into solid form to be later returned to the supply. The use of any of these substances avoids the need for a liquid air trap as any of the substances which may diffuse into the vessel to be evacuated will have a vapor pressure considerably less than the pressure desired within a vacuum tube of the pure electron discharge type and will, therefore, not affect the operation of such a tube.

This invention will be better understood by having reference to the following specification and accompanying drawing wherein is disclosed a side elevation of a pump embodying the invention.

The low vacuum or roughing pump 10, capable of producing a vacuum of $10^{-3}$ mm. of mercury, is connected by tubing to the bulb or other device 11 which is to be evacuated. Forming a part of the tubular connections are the pumping passage 12 and the passage 13 which enters the passage 12 at right angles thereto. The passage 12 is in communication with a receptacle 14 containing a substance 15 having the characteristics above described as being desirable in the pumping medium. The passages 12 and 13 are preferably made of pyrex glass, or other substance more refractory than lead glass, and are shown connected to the lead glass tubing 16 by sleeves 17 of platinum. The part 14 is preferably of metal inert to the pumping medium and is connected to the passage 12 according to the method disclosed in the patent to W. G. Houskeeper 1,291,466.

An electrical resistance heater 18 connected to a source of heating current 19 is provided for melting and vaporizing the substance 15 and a heater 20 is provided around the pumping passage 12. In the connections for the heater 20 is arranged a switch 21.

The operation of the device using for the pumping medium a substance such as lead, bismuth, tin and the like is as follows: The pump 10 is operated until the pressure is reduced to the neighborhood of $10^{-3}$ mm. of mercury. The substance in the chamber 14 is heated to a temperature at which its vapor pressure is greater than $10^{-3}$ mm. of mercury to cause the emanation therefrom of a stream of metallic vapor which flows through the passage 12 passing the mouth of the passage 13 and entraining with it gas flowing into the passage 12 from the tube 11 through the passage 13. At the same time the passage 12 is maintained at a temperature very slightly in excess of the melting temperature of the metal used as the pumping medium by means of the heater 20 controlled by switch 21. Such of the molecules of the pumping medium as are not flowing parallel to the passage 12 are condensed upon striking the wall of the passage to a liquid state and flow back into the boiler 14. The molecules which are travelling parallel to the passage entrain the gas from the bulb 11 and force it toward the roughing pump. As these molecules near the end of the pumping passage they are condensed into liquid form and flow back into the boiler 14 thus making the operation of the device continuous. Because of the fact that at room temperature these substances have vapor pressures much less than $10^{-6}$ mm. of mercury there is little tendency for vapor to diffuse into the bulb 11 and any of the substance which may diffuse back will not affect the obtaining therein of the desired vacuum and there is thus avoided the need of a trap.

Considering lead as the substance which is used as the pumping medium, the various temperatures of the different portions are maintained as follows: The lead in the boiler 14 is preferably heated to approximately 800° C. at which temperature it has a vapor pressure of slightly less than 1 mm. of mercury but more than $10^{-1}$ mm. of mercury. The pumping chamber and the portions of the glass tubing adjacent thereto are kept at approximately 325° C., the melting temperature of lead, at which temperature lead has a vapor pressure of approximately $10^{-7.5}$ mm. of mercury. The difference between the vapor pressure of lead at 800° C. and of the pressure maintained by the roughing pump causes the flow of a stream of lead vapor from its boiler toward the roughing pump through the pumping chamber. As the lead vapor reaches the lower temperature of the pumping chamber it condenses and flows back along the walls of the chamber and boiler to the edge of the puddle at a temperature at which its vapor pressure is less than that desired within the vacuum tube or $10^{-6}$ mm. of mercury.

In the operation of this pump with zinc or cadmium the operation is very similar. The substance is heated to a temperature slightly less than its melting point to sublimate it thereby causing the emanation from the solid substance of a vapor stream. The pumping passage 12, however, is preferably not heated during the pumping operation thereby causing the condensation on the walls of the tube by zinc in solid form which may be melted by heater 20, controlled by switch 21, at such times as the pump is not in operation and returned to the chamber 14.

It will be noted that the use of any of these pumping media avoids the necessity of cooling any portion of the metal below room temperatures, since each of these substances will solidify at such temperature and each has at such temperature a vapor pressure less than the pressure ordinarily required in a vacuum tube of the pure electron discharge type.

While various equivalents in materials, apparatus, and modes of procedure have been described, it is to be understood that the invention is generic in certain of its aspects and embraces a range of equivalents within the scope of the appended claims.

What is claimed is:

1. In combination, a vacuum pump having a pumping chamber, a vaporizable substance having at room temperature a vapor pressure less than that of mercury at the same temperature, and means for projecting a vapor jet of said substance through said pumping chamber.

2. In combination, a vacuum pump having a pumping chamber, a vaporizable substance having at room temperatures a vapor pressure less than the pressure employed in the pure electron discharge devices, and means for projecting a vapor jet of said substance through said pumping chamber.

3. In combination a roughing pump, an aspirator anterior thereof and a pumping medium for said aspirator, said medium having at room temperatures a vapor pressure less than the pressure maintained by said roughing pump.

4. In combination, a vacuum pump having a pumping chamber, a pumping medium which is solid at room temperatures, and means for vaporizing said medium and projecting a jet thereof through said pumping chamber.

5. In combination, a vapor type vacuum pump having a pumping chamber, a pumping medium having at its melting temperature a vapor pressure below the pressure desired in a vessel to be exhausted and at a higher temperature having a vapor pressure greater than said desired pressure, and means for vaporizing said medium and projecting a jet thereof through said pumping chamber.

6. In combination, a pump of the vapor type having a pumping chamber, a pumping medium having a melting temperature below 400° C. and a corresponding vapor pressure less than the pressure in pure electron discharge devices and having at temperatures not higher than 800° C. a vapor pressure of not less than $10^{-1}$ mm. of mercury, and means for vaporizing said medium and projecting a jet thereof through said pumping chamber.

7. In a pump, a pumping chamber, a puddle of molten material, means for maintaining said puddle at a temperature substantially higher than the melting temperature of said material to cause the emanation of a vapor stream into said pumping chamber, means for introducing the gas from the vessel to be exhausted into the vapor stream emanating from said puddle and means for maintaining the walls of the chamber in which the vapor and gas mix at a temperature only slightly above the melting temperature of the material.

8. An auxiliary pump adapted to cooperate with a roughing pump for exhausting to low pressures comprising a chamber connected to the roughing pump and to the vessel to be exhausted, a substance which at its melting temperature has a vapor pressure below the pressure desired in the vessel to be exhausted and which at a higher temperature has a vapor pressure in excess of that desired in the vessel to be exhausted, means for heating a mass of said substance to a temperature considerably higher than the melting temperature of said substance and means for maintaining the walls of said chamber at a temperature only slightly above the melting temperature of said substance.

9. In a pump, a pumping chamber, a substance solid at room temperatures and having at its melting point a vapor pressure less than the pressure within pure electron discharge devices and means for melting and vaporizing said substance to establish a vapor stream traversing said pumping chamber.

10. In a pump, a pumping chamber, a substance having at its melting temperature a vapor pressure less than the pressure employed in vacuum tubes of the pure electron discharge type and means for vaporizing said substance to establish a vapor stream traversing said pumping chamber.

11. In a pump, a pumping passage, a substance having at its melting point a vapor pressure less than the pressure employed in vacuum tubes of the pure electron discharge type, means for vaporizing said substance and causing the vapor to flow through said passage and means for heating said passage to the melting point of said substance.

12. In a pump, a pumping passage, a substance solid at room temperature and having at such temperature a vapor pressure less than $10^{-6}$ mm. of mercury, means for vaporizing said substance to establish a vapor stream traversing said pumping passage, and means for heating said passage.

13. In a pump, a pumping passage, a substance solid at room temperature and having at such temperature a vapor pressure less than the pressure employed in vacuum tubes of the pure electron discharge type, means for vaporizing said substance to establish a vapor stream traversing said pumping passage, and means for heating said passage.

14. In a pump, a pumping passage, a substance having at its melting temperature a vapor pressure less than $10^{-6}$ mm. of mercury, means for melting and vaporizing said substance to establish a vapor stream traversing said pumping passage, and means for maintaining said passage at approximately the melting point of said substance.

15. In a pump, a boiler, a pumping passage connected thereto, a substance in said boiler having at room temperatures a vapor pressure of less than $10^{-6}$ mm. of mercury, means for causing the emanation from said substance of a vapor stream into said passage, and a heater surrounding said passage.

16. In a pump, a boiler, a pumping passage in communication therewith, a conduit leading from said pumping passage to the vessel to be evacuated, a substance in said boiler having at room temperature a vapor pressure less than the pressure desired in the vessel to be evacuated, means for causing the emanation from said substance of a vapor stream into said pumping passage, and a heater surrounding said pumping passage at both sides of said conduit.

17. The method of operating a vapor pump which comprises vaporizing a pumping medium, utilizing the vapor to entrain gas from a vessel to be exhausted and condensing the vapor at a temperature materially above room temperature.

18. The method of operating a pump which comprises vaporizing a substance having at room temperature a vapor pressure less than $10^{-6}$ mm. of mercury, causing the vapor to act mechanically on gas from the vessel to be exhausted, and condensing said vapor at a temperature not less than room temperature.

19. The method of operating a pump which comprises melting a substance having at room temperature and at its melting temperature a vapor pressure less than $10^{-6}$ mm. of mercury, utilizing said vapor jet to entrain gas from a vessel to be exhausted, causing a vapor jet to emanate therefrom, condensing said vapor to a liquid state and returning said condensed substance to the supply thereof.

20. The method of operating a pump which consists in melting a substance having at room temperature a vapor pressure less than $10^{-6}$ mm. of mercury, causing a vapor jet to emanate therefrom, utilizing said jet to entrain gases from a vessel being exhausted and condensing said substance to a form at which its vapor pressure is less than $10^{-6}$ mm. of mercury.

21. The method of operating a pump which consists in vaporizing a substance having at room temperature a vapor pressure less than $10^{-6}$ mm. of mercury, causing the emanation of a vapor jet therefrom, utilizing said vapor to entrain gases from a vessel being exhausted and condensing said substance at a temperature at which its vapor pressure is less than $10^{-6}$.

22. In a pump, a pumping passage, a receptacle for the pumping substance, means for heating said receptacle and means for heating said pumping passage.

23. In a pump, a pumping passage, a conduit leading from said pumping passage to the vessel to be exhausted, a receptacle for the pumping substance, means for heating said receptacle and means for heating said pumping passage adjacent the entry thereto of said conduit.

24. In combination, a pump having a pumping chamber, a vessel to be exhausted, a conduit leading from said vessel to said pumping chamber, a pumping medium having at room temperatures a vapor pressure less than that desired in said vessel, and means for vaporizing said pumping medium to establish a vapor jet traversing said pumping chamber.

25. In combination, a pump having a pumping passage, a pumping medium having at room temperature a vapor pressure less than the pressure desired within said vessel, means to render said medium fluid and to cause the passage of said medium through said pumping chamber.

26. In combination, a vacuum pump having a pumping chamber, a pumping medium which at a pressure of $10^{-3}$ mm. of mercury has a melting temperature lower than its volatilizing temperature and which at room temperature has a vapor pressure less than that of mercury at the same temperature, and means for establishing a vapor jet from said medium traversing said pumping chamber.

27. In combination, a pumping chamber, a supply of lead, and means for vaporizing said lead to establish a jet of lead vapor traversing said pumping passage.

28. The method of operating a pump which comprises vaporizing a substance having at room temperature a vapor pressure less than $10^{-3}$ mm. of mercury and causing the vapor to act mechanically on gas from a vessel to be exhausted, without reducing the temperature of said gas during its travel from the vessel to the pumping chamber.

29. The method of operating a pump which comprises vaporizing a pumping medium and causing the vapor to act mechanically on gas from a vessel to be exhausted, without reducing the temperature of said gas during its travel from the vessel to the pumping chamber.

30. In combination, a pump having a pumping chamber, a vessel to be exhausted, a conduit leading from said vessel to said pumping chamber, said conduit being maintained at substantially room temperature, a pumping medium having at room temperatures a vapor pressure less than that desired in said vessel, and means for vaporizing said medium to establish a vapor jet traversing said pumping chamber.

In witness whereof, I hereunto subscribe my name this 17th day of June A. D., 1921.

WILLIAM G. HOUSKEEPER.